(12) United States Patent
Watanabe et al.

(10) Patent No.: US 10,872,114 B2
(45) Date of Patent: Dec. 22, 2020

(54) IMAGE PROCESSING DEVICE, IMAGE RETRIEVAL INTERFACE DISPLAY DEVICE, AND METHOD FOR DISPLAYING IMAGE RETRIEVAL INTERFACE

(71) Applicant: HITACHI, LTD., Tokyo (JP)

(72) Inventors: Yuki Watanabe, Tokyo (JP); Kenichi Morita, Tokyo (JP); Atsushi Hiroike, Tokyo (JP)

(73) Assignee: HITACHI, LTD., Tokyo (JP)

( * ) Notice: Subject to any disclaimer, the term of this patent is extended or adjusted under 35 U.S.C. 154(b) by 191 days.

(21) Appl. No.: 16/062,308

(22) PCT Filed: Dec. 17, 2015

(86) PCT No.: PCT/JP2015/085347
§ 371 (c)(1),
(2) Date: Jun. 14, 2018

(87) PCT Pub. No.: WO2017/104043
PCT Pub. Date: Jun. 22, 2017

(65) Prior Publication Data
US 2018/0373737 A1   Dec. 27, 2018

(51) Int. Cl.
*G06F 17/00* (2019.01)
*G06F 7/00* (2006.01)
(Continued)

(52) U.S. Cl.
CPC ........ *G06F 16/5838* (2019.01); *G06F 16/532* (2019.01); *G06F 16/5854* (2019.01);
(Continued)

(58) Field of Classification Search
CPC ............. G06F 16/5838; G06F 16/5854; G06F 16/9038; G06F 16/532; G06K 9/00664; G06K 9/00711; G06K 9/522; G06K 9/72
(Continued)

(56) References Cited

U.S. PATENT DOCUMENTS 6,574,378 B1 * 6/2003 Lim .................... G06F 16/5854
382/305
8,768,048 B1 * 7/2014 Kwatra .................... G06K 9/72
382/159
(Continued)

FOREIGN PATENT DOCUMENTS

JP   2002-024256 A   1/2002
JP   2007-122694 A   5/2007
(Continued)

OTHER PUBLICATIONS

International Search Report for WO 2017/104043 A1, dated Mar. 1, 2016.

*Primary Examiner* — Pavan Mamillapalli
(74) *Attorney, Agent, or Firm* — Volpe Koenig

(57) ABSTRACT

An image processing device includes a processor, a storage unit coupled to the processor and storing an image database, and a display unit coupled to the processor. The processor obtains arrangement information of a first object on the display unit when the processor accepts an input of the first object via the display unit. The processor obtains first co-occurrence information using the first object and the arrangement information of the first object. The first co-occurrence information indicates a correlation relationship with the first object based on the image database. The processor outputs a candidate for a second object based on the first co-occurrence information to the display unit.

15 Claims, 15 Drawing Sheets

(51) Int. Cl.
*G06F 16/583* (2019.01)
*G06K 9/72* (2006.01)
*G06K 9/00* (2006.01)
*G06F 16/9038* (2019.01)
*G06F 16/532* (2019.01)
*G06K 9/52* (2006.01)

(52) U.S. Cl.
CPC ..... *G06F 16/9038* (2019.01); *G06K 9/00664* (2013.01); *G06K 9/00711* (2013.01); *G06K 9/522* (2013.01); *G06K 9/72* (2013.01)

(58) Field of Classification Search
USPC .......................................................... 707/736
See application file for complete search history.

(56) References Cited

U.S. PATENT DOCUMENTS

| | | | | |
|---|---|---|---|---|
| 2001/0046321 A1* | 11/2001 | Murakawa | ............... | G06T 7/49 382/190 |
| 2002/0057343 A1* | 5/2002 | Ronk | ................... | G06F 16/5838 348/169 |
| 2007/0077025 A1* | 4/2007 | Mino | .................... | G06F 16/532 386/241 |
| 2007/0276857 A1* | 11/2007 | Fujio | .................. | G06F 16/2428 707/999.102 |
| 2010/0076995 A1 | 3/2010 | Pan et al. | | |
| 2013/0250164 A1* | 9/2013 | Aoki | .................. | H04N 5/23218 348/348 |
| 2014/0149376 A1* | 5/2014 | Kutaragi | ............... | G06F 16/532 707/706 |
| 2015/0363660 A1* | 12/2015 | Vidal | .................. | G06K 9/4642 382/173 |

FOREIGN PATENT DOCUMENTS

| | | |
|---|---|---|
| JP | 2007-316798 A | 12/2007 |
| JP | 2010-522385 A | 7/2010 |
| JP | 2010-181991 A | 8/2010 |
| JP | 2011-197892 A | 10/2011 |
| JP | 2013-092955 A | 5/2013 |

* cited by examiner

Fig. 3A

| Image ID | Image Data | Feature Value |
|---|---|---|
| 1 | Binary | [29, 52, 242, ...] |
| 2 | Binary | [223, 250, 42, ...] |
| ... | ... | |

Fig. 3B

| Substance ID | Image ID | Category | Horizontal Coordinate | Vertical Coordinate | Width | Height | Feature Value |
|---|---|---|---|---|---|---|---|
| 1 | 1 | Object_A | 0.5 | 0.3 | 0.8 | 0.4 | [39, 223, 192, ...] |
| 2 | 1 | Object_B | 0.3 | 0.8 | 0.4 | 0.2 | [19, 226, 17, ...] |
| 3 | 1 | Object_C | 0.8 | 0.8 | 0.1 | 0.3 | [29, 231, 207, ...] |
| 4 | 2 | Object_C | 0.2 | 0.7 | 0.2 | 0.4 | [248, 35, 158, ...] |
| 5 | 2 | Object_B | 0.5 | 0.3 | 0.6 | 0.3 | [239, 27, 163, ...] |
| ... | ... | ... | ... | ... | ... | ... | ... |

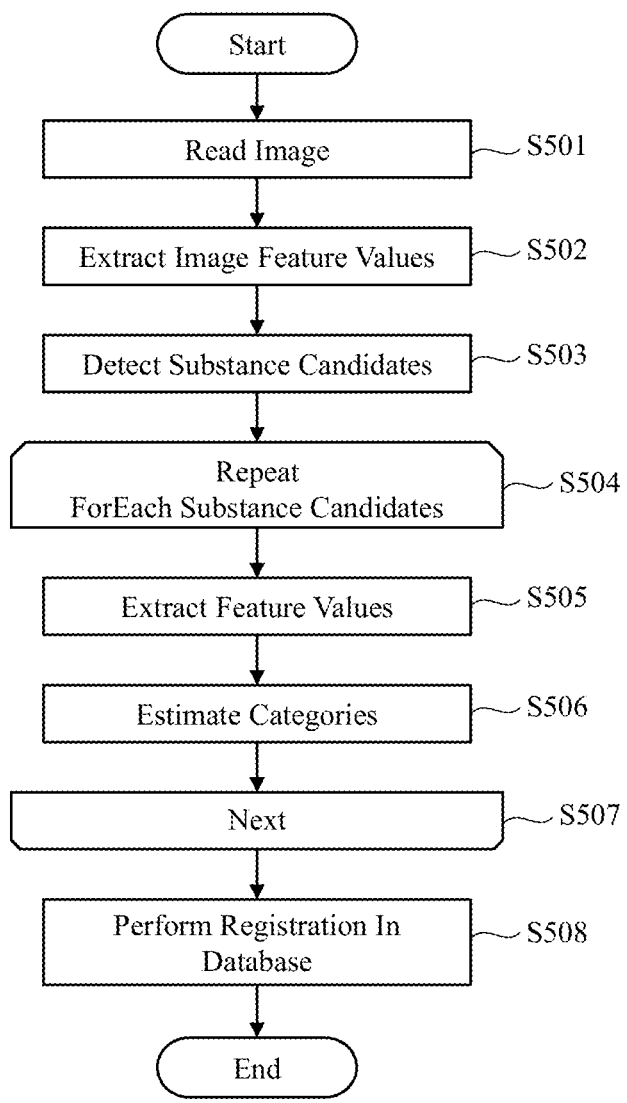

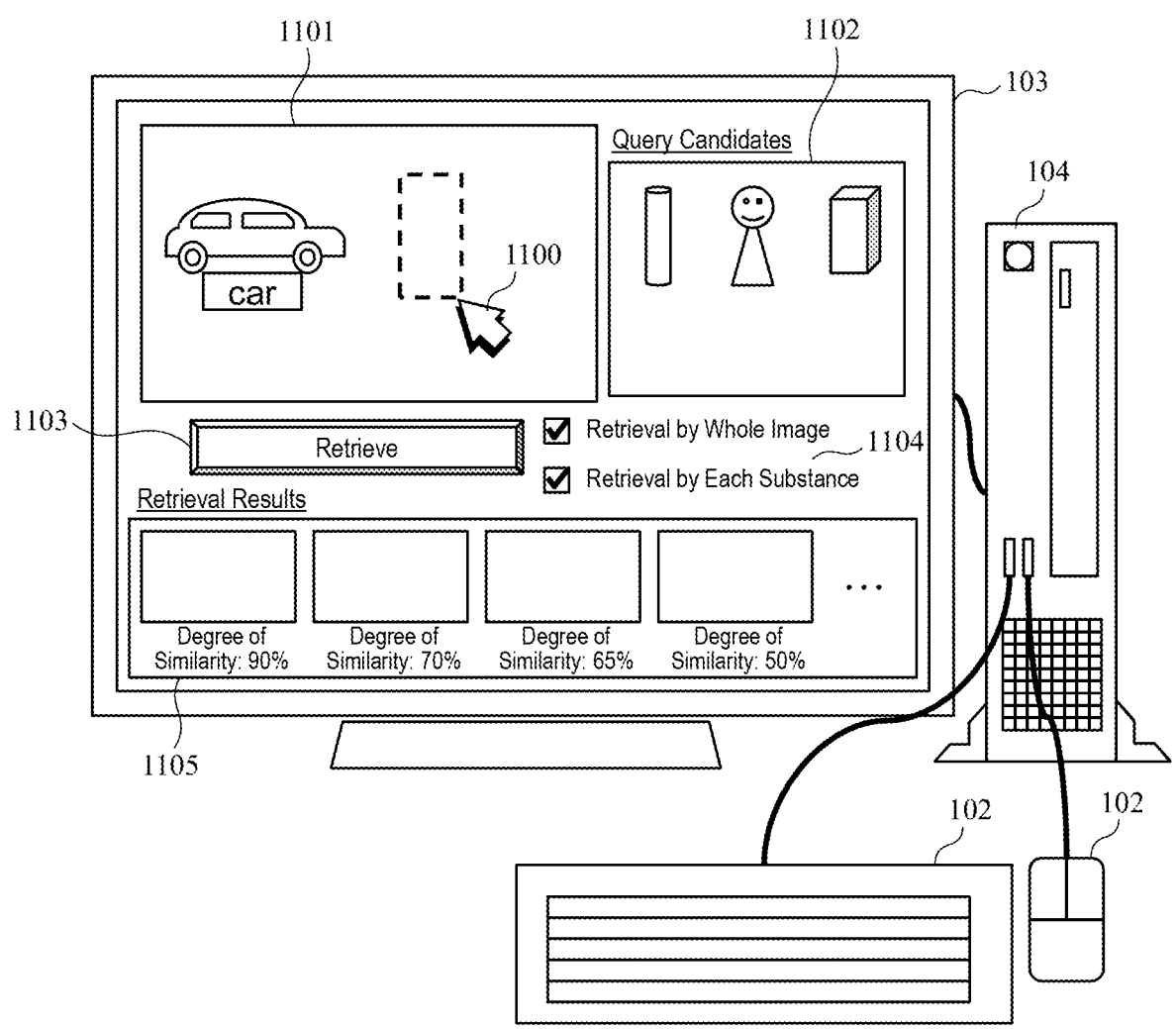

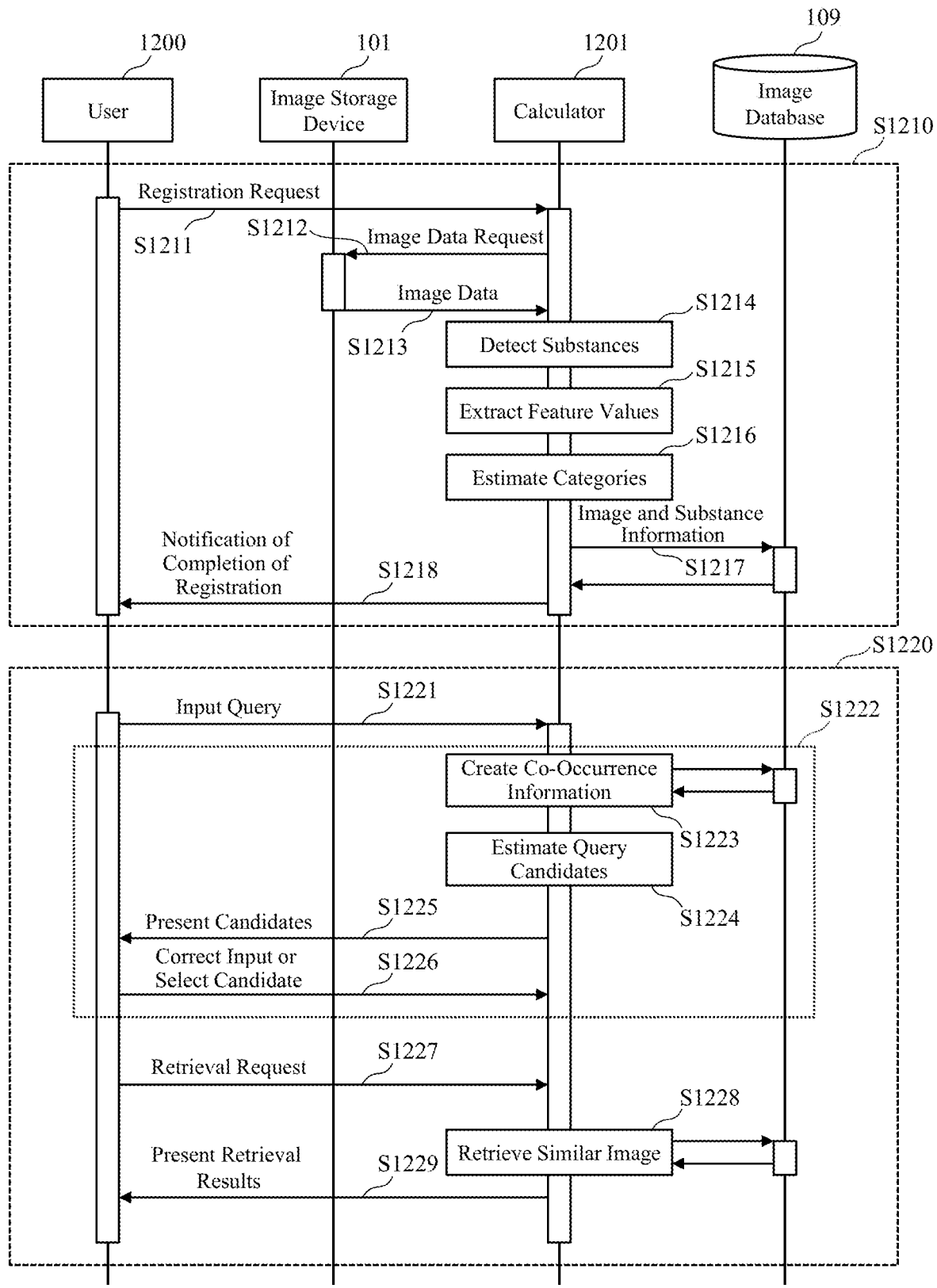

IMAGE PROCESSING DEVICE, IMAGE RETRIEVAL INTERFACE DISPLAY DEVICE, AND METHOD FOR DISPLAYING IMAGE RETRIEVAL INTERFACE

TECHNICAL FIELD

The present invention relates to an image processing device, an image retrieval interface display device, and a method for displaying an image retrieval interface.

BACKGROUND ART

Owing to a digital archive of a television video and a spread of a video distribution service on the Internet, a necessity for retrieving and classifying large-scale image data at high speed has been increasing. Additionally, an expectation for an analysis of monitor images accumulated for security has been increasing. Because of difficulty in giving text information to these enormous volumes of images by manpower, an image retrieval technique using feature values in the images has been requested.

A large-scale, high-speed similar image retrieval system has been putting into practical use. For example, a technique that extracts image feature values in advance, constructs a database, and finds out an image apparently similar to a query image at high speed has been proposed. A combination with an image processing technique that detects a region including a substance in an image allows a detailed similar image retrieval focusing on the substance in the image.

Patent Literature is disclosed as a background art of this technical field. Patent Literature 1 describes that "names of objects included in an image desired to be retrieved are input as keywords and a query image in which the objects are laid out and arranged is created for image retrieval" (see ABSTRACT).

A system described in Patent Literature 1 obtains image samples of the substances using the plurality of keywords designated by a user, automatically creates the layout in accordance with average size and position of the substances, and performs a similar image retrieval using an image synthesized in accordance with this layout.

CITATION LIST

Patent Literature

Patent Literature 1: JP 2011-197892 A

SUMMARY OF INVENTION

Technical Problem

The user needs to input many pieces of information (the keywords) on the substances in the system described in Patent Literature 1. Here, even when the plurality of pieces of information on the substances are input, since the system described in Patent Literature 1 does not produce retrieval queries considering a relationship among the plurality of substances, this possibly results in deterioration of retrieval accuracy.

The present invention provides a technique that assists creation of a retrieval query considering a relationship among a plurality of substances.

Solution to Problem

For example, to solve the problems, the configurations described in claims are employed. This application includes a plurality of means to solve the problems. As one example, there is provided an image processing device that includes a processor, a storage unit, and a display unit. The storage unit is coupled to the processor. The storage unit stores an image database. The display unit is coupled to the processor. The processor obtains arrangement information of a first object on the display unit when the processor accepts an input of the first object via the display unit. The processor obtains first co-occurrence information using the first object and the arrangement information of the first object. The first co-occurrence information indicates a correlation relationship with the first object based on the image database. The processor outputs a candidate for a second object based on the first co-occurrence information to the display unit.

As another example, there is provided an image retrieval interface display apparatus that includes a processor and a display unit. The display unit is coupled to the processor. The display unit is configured to display an image retrieval interface including a query input region. The processor displays a candidate for a second object on the image retrieval interface when a first object is input to the query input region. The processor displays a second object on the query input region when the second object is selected.

As another example, there is provided a method for displaying an image retrieval interface in an information processing device that includes a processor, a storage unit, and a display unit. The storage unit is coupled to the processor. The storage unit stores an image database. The display unit is coupled to the processor. The method for displaying the image retrieval interface includes a step of obtaining arrangement information of a first object on the display unit when the processor accepts an input of the first object via the display unit; a step of obtaining first co-occurrence information using the first object and the arrangement information of the first object by the processor, the first co-occurrence information indicating a correlation relationship with the first object based on the image database; and a step of outputting a candidate for a second object based on the first co-occurrence information to the display unit by the processor.

Advantageous Effects of Invention

The present invention can assist creation of a retrieval query considering a relationship among a plurality of substances. Further features related to the present invention are clarified from the description of the present specification and the accompanying drawings. Problems, configurations, and effects other than ones described above will be clarified in the following explanation of embodiments.

BRIEF DESCRIPTION OF DRAWINGS

FIG. 3A is a drawing illustrating a structure example of an image database according to Embodiment 1.

FIG. 3B is a drawing illustrating a structure example of the image database according to Embodiment 1.

FIG. 5 is an example of a flowchart for a database registration process according to Embodiment 1.

FIG. 11A is a drawing illustrating an example of an image retrieval interface according to Embodiment 1.

FIG. 12 is one example of a sequence diagram of a process of a whole system according to Embodiment 1.

DESCRIPTION OF EMBODIMENTS

Figure 1:
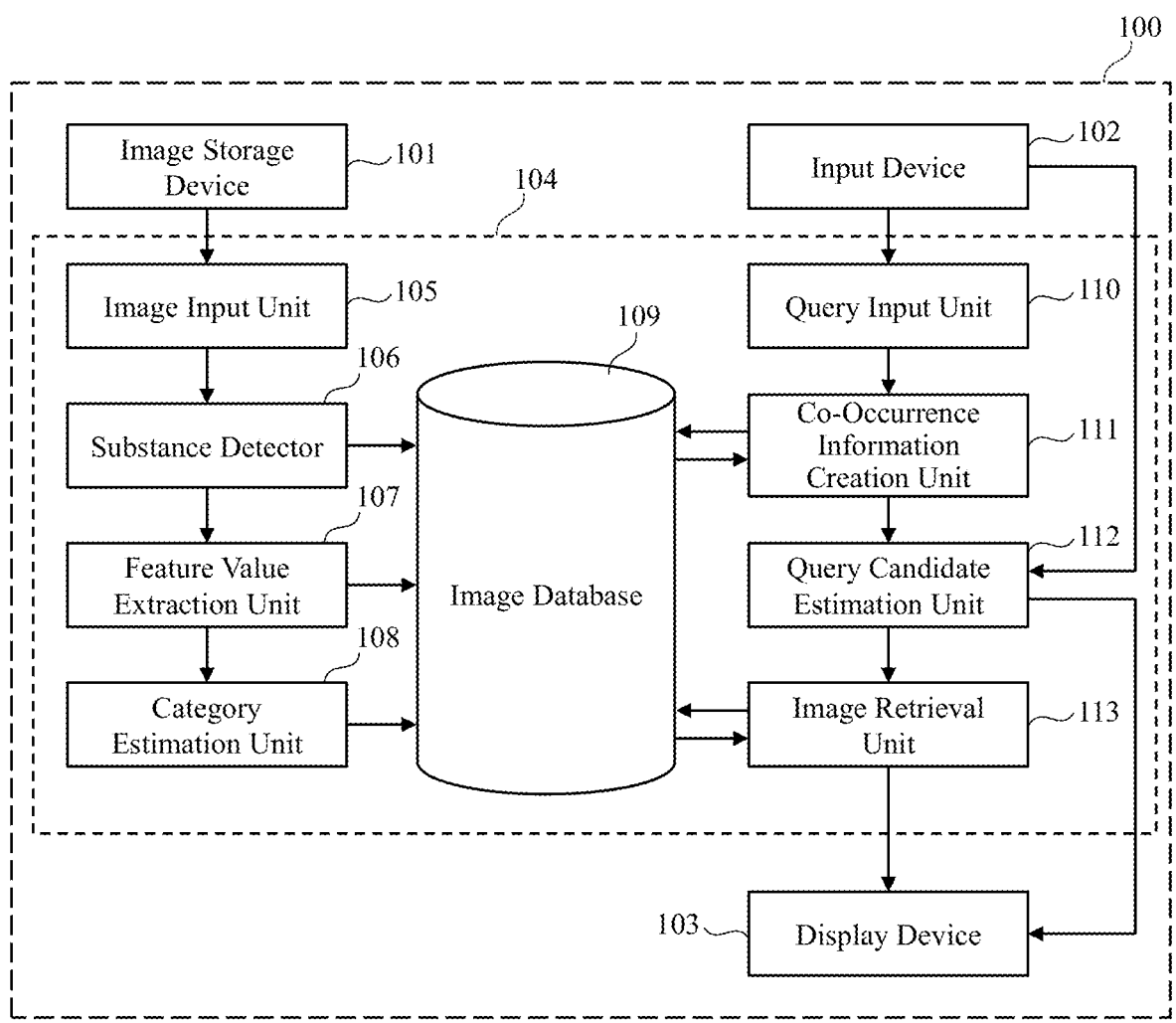
FIG. 1 is a block diagram illustrating a configuration example of an image retrieval system according to Embodiment 1.

The following explains embodiments of the present invention with reference to the attached drawings. Although the accompanying drawings illustrate specific embodiments based on the principle of the present invention, these drawings are used to understand the present invention and are never used to interpret the present invention in a limited manner. In each drawing, an identical reference numeral is assigned for a common configuration in some cases.

Outline of Embodiments

An image retrieval device described below is a device that performs a similar image retrieval focusing on substances in an image. The image retrieval device detects substances from an image as a new target for registration, extracts feature values of the detected substances, and estimates categories. A database accumulates arrangement information and the feature values of the substances together with the images. An image retrieval is automatically performed using an input first query (the image and the arrangement information of the substance) as a condition during the retrieval. Information on other substances included in the image including the first query is obtained from the database by the obtained retrieval result to obtain co-occurrence information with the substance of the first query. Co-occurrence of the substances in the image expresses a probability of simultaneous presence of a substance A and a substance B in the image. The following example assumes that the co-occurrence of the substances in the image expresses the probability of appearance of the substance B when the substance A is present in a certain region X in the image for each region.

The image retrieval device presents candidates for a second query (the substance and the arrangement information of the substance) to a user using the obtained co-occurrence information. The user can detail the retrieval query by simply selecting a desired substance among the presented candidates. The retrieval query obtained as the result of repetition of this operation includes a probable combination of substances and their arrangements; therefore, accuracy of the image retrieval is enhanced.

Embodiment 1

FIG. 1 is a block diagram illustrating a configuration example of an image retrieval system 100 according to Embodiment 1. The image retrieval system 100 includes a user interface for query input assistance using the co-occurrence information of the substances. This configuration allows efficient execution of the image retrieval focusing on the substances in the image.

The image retrieval system 100 includes, for example, an image storage device 101, an input device 102, a display device 103, and an image retrieval device 104. The image storage device 101 is a storage medium storing still image data or moving image data and constituted, for example, using a hard disk drive built into a computer or a storage system connected with a network such as a Network Attached Storage (NAS) or a Storage Area Network (SAN). The image storage device 101 may be, for example, a cache memory that temporarily holds image data continuously input from a camera.

The input device 102 is an input interface such as a computer mouse, a keyboard, and a touch device to transmit a user's operation to the image retrieval device 104. The display device 103 is, for example, an output interface such as a liquid crystal display used for display of the retrieval result by the image retrieval device 104 and an interactive operation with the user.

The image retrieval device 104 extracts information required for the retrieval and performs a registration process to the database. The registration process includes a detection of substance regions from the images accumulated in the image storage device 101, an extraction of an image feature value of each detected region, an estimation of categories of the substances, and a registration of the information in an image database 109.

The image retrieval device 104 retrieves an image matching the retrieval query from the image database 109 using the retrieval query designated by the user from the input device 102 and performs a retrieval process to display the retrieval results on the display device 103.

The user designates the query in the retrieval process. The query includes the substance and the arrangement information of the substance. The user, for example, designates the arrangement information of the substance on a canvas displayed on the display device 103 and inputs a name or the image of the substance. The arrangement information includes a size and location information (coordinates in the following example) of the substance. The image retrieval device 104 creates the co-occurrence information of the input substance from the data accumulated in the image database 109, estimates substances with a high possibility of being input by the user next, and displays the candidates on the display device 103. The user selects the substance from the presented candidates, thus ensuring creating the retrieval query in which the plurality of substances are designated without inputting the images and the arrangement information of the substances again and again. The image retrieval device 104 performs the image retrieval using the created retrieval query and displays the retrieval results on the display device 103.

The image retrieval device 104 includes an image input unit 105, a substance detector 106, a feature value extraction unit 107, a category estimation unit 108, the image database 109, a query input unit 110, a co-occurrence information creation unit 111, a query candidate estimation unit 112, and an image retrieval unit 113. The image input unit 105, the substance detector 106, the feature value extraction unit 107, and the category estimation unit 108 are processing modules for execution of the above-described registration process. The query input unit 110, the co-occurrence information creation unit 111, the query candidate estimation unit 112, and the image retrieval unit 113 are processing modules for execution of the above-described retrieval process.

The image input unit 105 accepts the input of the still image data or the moving image data from the image storage device 101 and converts the input data into data in a format used at the inside of the image retrieval device 104 according to the data format of the input data. For example, when accepting the input of the moving image data, the image input unit 105 performs a moving image decoding process that breaks up the data into frames (a still image data format).

The substance detector 106 detects a partial region including a substance from the input image. A substance detection process can employ a known method. For example, the substance detector 106 may use a discriminator reacting to only the substance in a specific category to detect the region by scanning in the image. The substance detector 106 may use a local feature of a color and a shape and perform a region segmentation to detect candidates for regions with a high possibility of including any given substance. Note that "the substance (the object)" may include a shapeless substance such as "sky," "sea," and "forest" in addition to the substance with a fixed shape. This system detects, for example, several to tens of substance regions from one image by the substance detection process. Information of the detection results is, for example, expressed by four values, a horizontal coordinate and a vertical coordinate at the center of the region and a width and a height of the region. The substance detector 106 registers the information of the detection results in the image database 109.

The feature value extraction unit 107 extracts the image feature values from the whole input image and the substance regions detected from the input image. The image feature value is a value, which is comparable between the images, indicating a feature such as a color, a shape, and a texture of the image. The image feature value is expressed by, for example, a vector with a fixed length. The image feature value only needs to be the information comparable between the images and the known various pieces of information may be employed. The feature value extraction unit 107 registers the obtained image feature value in the image database 109.

The feature value extraction unit 107, for example, may perform a clustering process of data for the purpose of high-speed retrieval when registering the image feature value in the image database 109. The feature value extraction unit 107, for example, creates a cluster constituted of one or more pieces of registration data having feature values of high degree of similarity by the clustering process such as k-means algorithm. The degree of similarity is an index indicative of similarity between two feature values of an identical type and is obtained by, for example, assigning a distance between the two feature values to a predetermined reduction function in a range of [0, 1]. Various known methods may be employed for the calculation of the degree of similarity.

The image database 109 records, for example, a representative value of the clusters (for example, a mean vector of cluster members) and IDs of the cluster members. During the retrieval, the image retrieval device 104, for example, compares the feature value of the retrieval query with the representative value of the clusters and compares the feature values between the retrieval query and members of these clusters only for the clusters with the high degree of similarity. This process reduces a count of processes, thereby ensuring the high-speed retrieval.

The category estimation unit 108 estimates the category or the substance name of the partial region detected by the substance detector 106. The category estimation unit 108 includes, for example, an image category classifier created by machine learning. The category estimation unit 108 inputs the feature values extracted by the feature value extraction unit 107 to the image category classifier to output the categories. When the discriminator for the specific category is used in the substance detection process, the category of the discriminator may be used as it is. The category estimation unit 108 registers the obtained category or name of the substance in the image database 109.

The image database 109 holds the image data, the detection results of the substances, the image feature values of the substances, the categories of the substances, and similar data obtained through the above-described processes. Since the image database 109 stores the feature values, the co-occurrence information creation unit 111 and the image retrieval unit 113 described later can perform the similar image retrieval using the feature values.

The similar image retrieval in the image retrieval device 104 is a function to sort data in the order of the feature value being close to that of the query and output the data. The image retrieval unit 113, for example, compares the feature values using a Euclidean distance between the vectors. The similar image retrieval can set only the data matching the condition as the retrieval target. For example, the retrieval range can be narrowed down by conditioning the coordinates of the substance. The structure of the image database 109 will be described later in detail with reference to FIG. 3.

The behavior of each unit in the registration process by the image retrieval device 104 has been described above. Next, the following explains a behavior of each unit in the retrieval process by the image retrieval device 104.

The query input unit 110 accepts the query designated by the user via the input device 102. In the image retrieval device 104, the query is provided using the image and the arrangement information (the size and the coordinates of the substance) of the substance. The image retrieval device 104 may internally hold a conversion table in which keywords or audios are associated with the images, and the query input unit 110 may be configured so as to accept the keyword or the audio as the query. Furthermore, frequently used substances may be held as templates such that the user selects a substance from the templates displayed in a list on the user interface.

The co-occurrence information creation unit 111 creates the co-occurrence information between the substance and another substance from the input substance and the arrangement information of the substance. The co-occurrence information is information indicative of a probability of appearance of the other substance B in the image when the certain substance A appears in the image. The co-occurrence information on the image includes space information as to which region in the image has a high possibility of the appearance of the other substance B. For example, regarding the coordinates in the image, the image is divided in a grid pattern, and the probability of each region including the substance B when the substance A is designated at the certain region is obtained. The co-occurrence information may include information such as a depth and a size of the substance. The co-occurrence information creation unit 111 creates the co-occurrence information using substance information accumulated in the image database 109. The creation of the co-occurrence information will be described later in detail with reference to FIG. 7.

The query candidate estimation unit 112 displays candidates for the query with the high possibility of being input by the user next on the display device 103 using the created co-occurrence information. After the user inputs the first query, the query candidate estimation unit 112 may draw the substance with high co-occurrence and the position of the substance on the user interface on the display device 103. As another example, after the user designates the location of the second query, the query candidate estimation unit 112 may display substances (for example, substances with high probability of appearance) with high co-occurrence regarding the location in a list in the order of high probability of appearance. Additionally, as another example, when the user designates the substance name, the query candidate estimation unit 112 may display candidates for arrangement of the substance.

Repeatedly performing the above-described query input process ensures obtaining the retrieval query conditioning the plurality of substances and the arrangements of the substances. The image retrieval unit 113 retrieves the image corresponding to this retrieval Query from the image database 109. Details of the retrieval process will be described later as an explanation of FIG. 10. The retrieval results are output as a list in which pairs of IDs of the images registered in the image database 109 and degrees of similarity with the Query are sorted in the order of high degree of similarity. The image retrieval unit 113 presents the retrieval results obtained by the above-described retrieval process to the user by displaying the retrieval results on the user interface of the display device 103.

Figure 2:
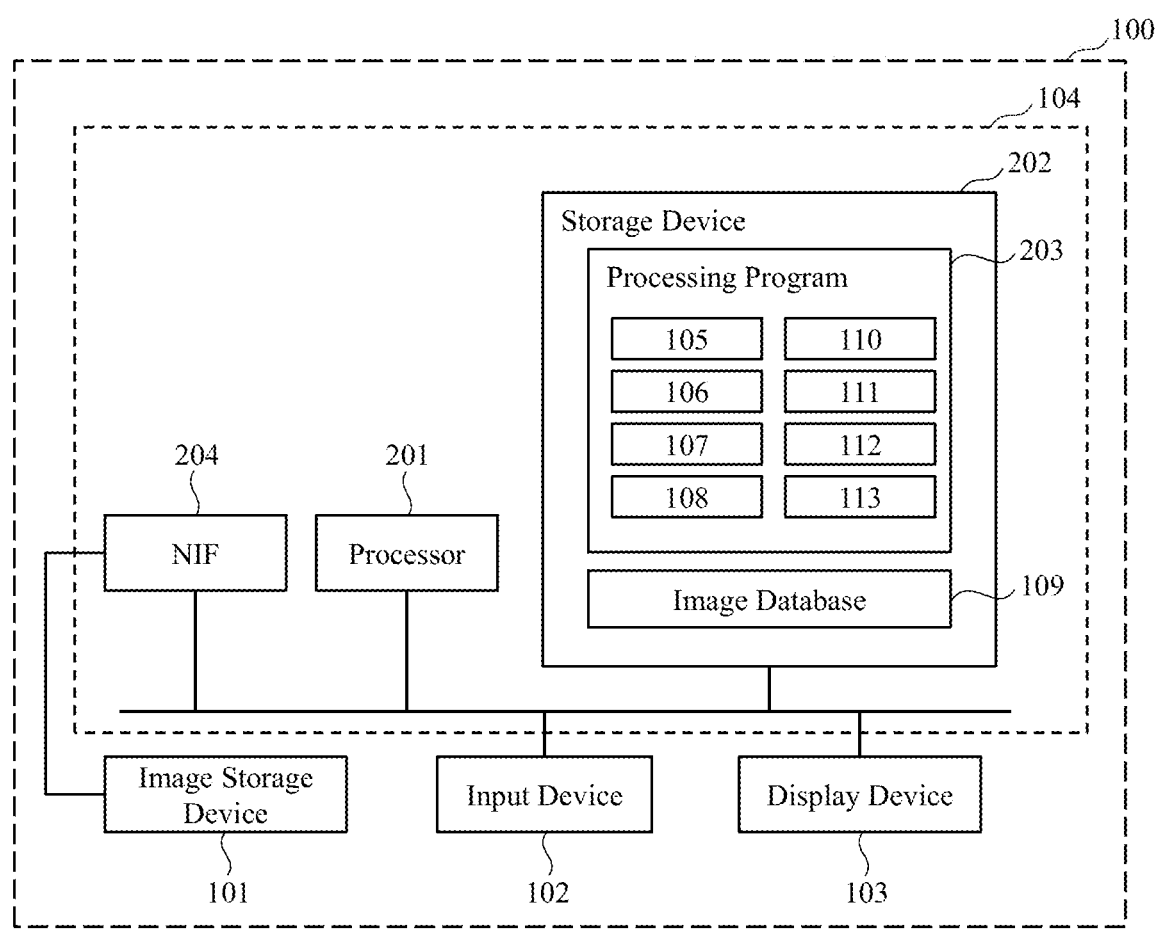
FIG. 2 is a block diagram illustrating a configuration example of hardware of the image retrieval system according to Embodiment 1.

FIG. 2 is a block diagram illustrating a configuration example of hardware of the image retrieval system 100 according to this embodiment. The image retrieval device 104 is achieved by, for example, a general calculator. For example, the calculator constituting the image retrieval device 104 may include a processor 201 and a storage device 202 coupled to one another. The storage device 202 is constituted of a storage medium of any type. For example, the storage device 202 may be constituted by a combination of a semiconductor memory and a hard disk drive. The input device 102 and the display device 103 are coupled to the processor 201 to ensure input and output operations by this calculator.

Function modules such as the image input unit 105, the substance detector 106, the feature value extraction unit 107, the category estimation unit 108, the query input unit 110, the co-occurrence information creation unit 111, the query candidate estimation unit 112, and the image retrieval unit 113 are achieved by, for example, execution of a processing program 203 stored in the storage device 202 by the processor 201. In other words, the processing program 203 includes a program achieving each of the above-described function modules, and the processor 201 performs the processes of each function module based on the processing program 203. Accordingly, explanations on process contents with the function modules of FIG. 1 as the subject in the following explanation may be regarded as explanations with the processor 201 as the subject.

For example, the storage device 202 includes the data in the image database 109. In a configuration with a plurality of servers aiming to sharing a processing load or a similar purpose, the image database 109 and the device where the processing program 203 is performed may be physically different servers connected over a network.

The image retrieval device 104 further includes a network interface device (NIF) 204 coupled to the processor 201. The image storage device 101 may be, for example, the NAS or the SAN coupled to the image retrieval device 104 via the network interface device 204. As another example, the storage device 202 may include the image storage device 101.

FIG. 3A and FIG. 3B are explanatory views illustrating examples of the configuration and the data of the image database 109 according to this embodiment. In this embodiment, the information used by the system does not depend on the data structure and may be expressed by any sort of data structure. While FIG. 3A and FIG. 3B illustrate the examples of a table format, for example, a data structure appropriately selected from a table, a list, a database, or a queue can store the information.

The image database 109 includes, for example, an image table 300 holding image information and a substance table 310 holding the substance information. Each table configuration and a field configuration of each table of FIG. 3A and FIG. 3B are merely one example, and, for example, a table and a field may be added according to an application. As long as similar information is held, the table configuration may be changed. For example, the image database 109 may be constituted of one table created by merging the image table 300 and the substance table 310.

The image table 300 includes, for example, an image ID field 301, an image data field 302, and a feature value field 303. The image ID field 301 holds identification numbers of respective image data. The image data field 302, for example, holds the image data used to display the retrieval results in binary. The feature value field 303 holds the feature values extracted from the images. The feature value is provided by, for example, vector data with a fixed length.

The substance table 310 includes, for example, a substance ID field 311, an image ID field 312, a category field 313, a horizontal coordinate field 314, a vertical coordinate field 315, a width field 316, a height field 317, and a feature value field 318.

The substance ID field 311 holds the identification numbers of the substances detected from the images. The image ID field 312 holds the IDs of the images as the detection sources of the substances. The category field 313 holds category estimation results of the substances. While FIG. 3B expresses the categories by character strings, the category field 313 may be held by identification numbers managed by the table or in the application.

The horizontal coordinate field 314 holds the horizontal coordinates of the central coordinates of the substances, the vertical coordinate field 315 holds the vertical coordinates of the central coordinates of the substances, and the width field 316 holds the widths of the substances, and the height field 317 holds the heights of the substances. In the example of FIG. 3B, these fields 314 to 317 hold values normalized by the image sizes. The horizontal coordinate and the width express proportions when the width of the image as the detection source is defined as 1, and the vertical coordinate and the height express proportions when the height of the image as the detection source is defined as 1.

Figure 4A:
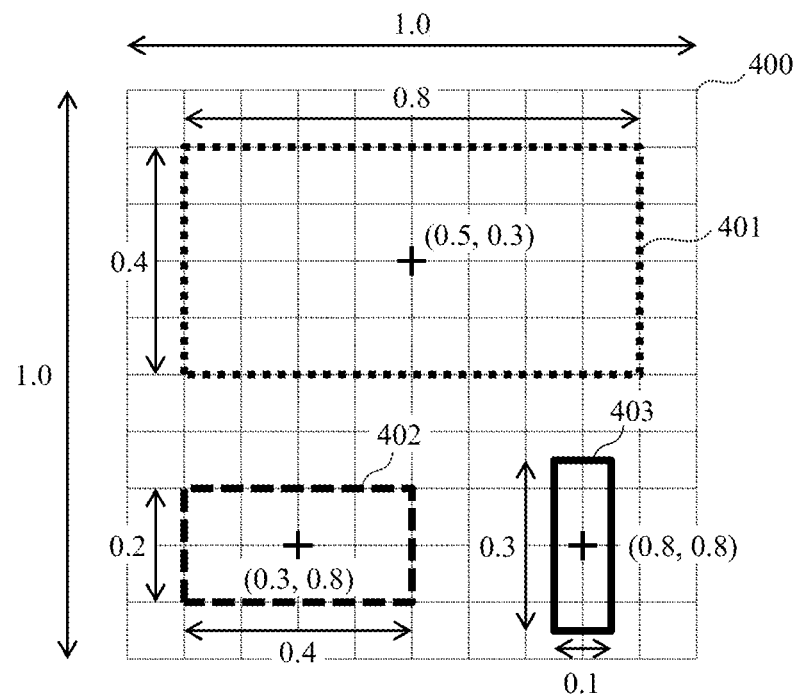
FIG. 4A is a drawing illustrating a first example of arrangement information of substances in an image according to Embodiment 1.
Figure 4B:
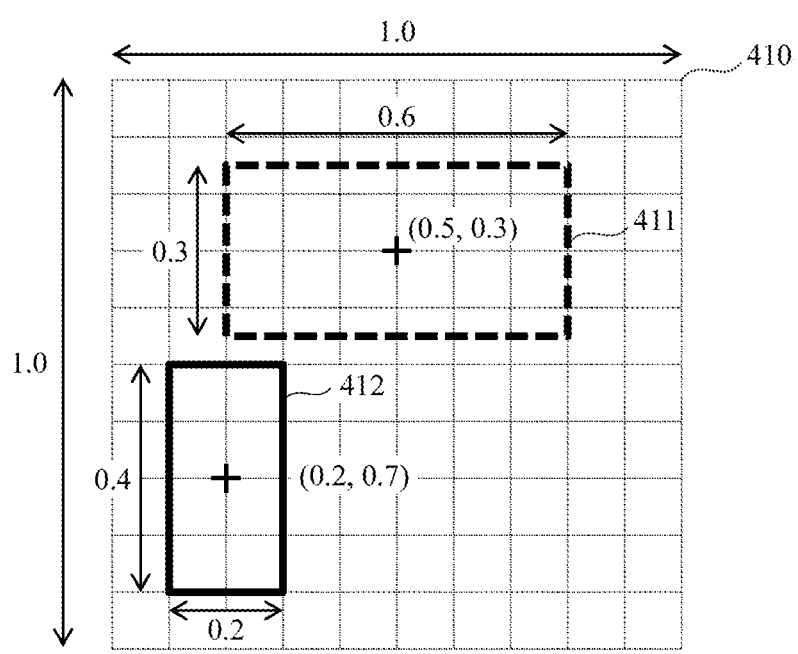
FIG. 4B is a drawing illustrating a second example of the arrangement information of the substances in the image according to Embodiment 1.

FIG. 4A and FIG. 4B are drawings explaining an example of the substance detection by the substance detector 106 and the normalized coordinates. FIG. 4A illustrates an example of detection of a substance 401, a substance 402, and a substance 403 from an image 400. FIG. 4B illustrates an example of detection of a substance 411 and a substance 412 from an image 410. For example, the substance 401 has the normalized central coordinates of [0.5, 0.3], width of 0.8, and height of 0.4.

The feature value extraction unit 107 extracts the feature values from the regions of the substances. The feature value field 318 holds the feature values extracted from the regions of the substances. As the feature value of the substance, a feature value extracted by an algorithm different from that of the feature value of the whole image may be used.

The image retrieval device 104 according to this embodiment creates the co-occurrence information using the substance information constructed during the registration and assists the query input by the user based on the co-occurrence information, thereby ensuring facilitating execution of the image retrieval.

To obtain the information required to create the co-occurrence information, the registration process of the retrieval target in the image database 109 needs to be performed before execution of the retrieval. As long as the information in the configuration examples of the image database 109 explained in FIG. 3A and FIG. 3B is accumulated, a procedure during the registration may be any procedure, and, for example, the procedure of FIG. 5 is usable.

FIG. 5 is a drawing expressing a process flow for the database registration. The following explains each step of FIG. 5.

The image input unit 105 obtains the image data from the image storage device 101 and converts the obtained image data into image data in a format usable at the inside of the system as necessary (S501). For example, when accepting an input of moving image data, the image input unit 105 performs a moving image decoding process that breaks up the moving image data into frames (the still image data format).

The feature value extraction unit 107 extracts the feature values from the image input at Step S501 (S502).

The substance detector 106 detects substance candidate regions (hereinafter simply referred to as "substances") from the image input at Step S501 (S503). Then, the substance detector 106 normalizes each of the central coordinates (the horizontal coordinates and the vertical coordinates), the widths, and the heights of the detected substances by the width and the height of the image. As described above, the method using a raster scan by the discriminator and the method using the region segmentation are usable to detect the substances.

The image retrieval device 104 repeatedly performs processes of Step S505 and Step S506 on each substance detected at Step S503 (a loop from S504 to S507). The feature value extraction unit 107 extracts the image feature values from the regions of the substances as the process targets (S505). The category estimation unit 108 estimates the categories of the substances using the feature values obtained at Step 505 (S506). For example, a category classifier created through machine learning is usable for the estimation of the category. At this time, the category estimation unit 108 may determine and discard a substance not corresponding to any category as a false detection.

The image retrieval device 104 registers the images and the information on the substances obtained by the above-described processes in the image database 109 (S508). At this time, a data clustering process may be performed on the feature values to achieve the high-speed retrieval.

Figure 6:
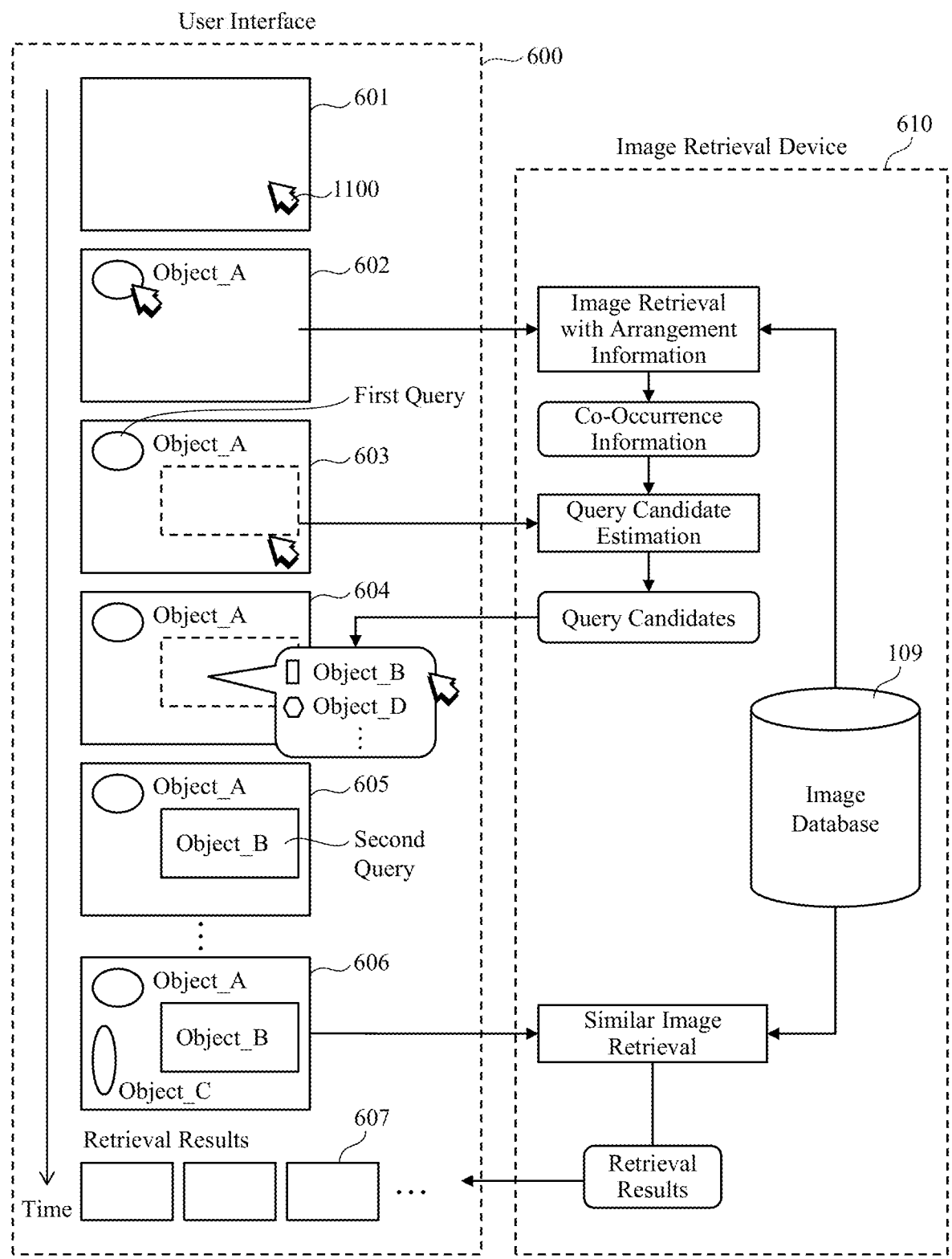
FIG. 6 is a drawing explaining an example of a query input assistance and an image retrieval using co-occurrence information according to Embodiment 1.

FIG. 6 is a drawing explaining the query input assistance based on the co-occurrence information. 600 in FIG. 6 expresses a transition of a query input screen displayed on the display device 103 in a time series, and 610 in FIG. 6 expresses a data flow inside the image retrieval device 104.

The display device 103 displays a blank canvas (601). The user arranges queries on the canvas using the input device 102. The user, for example, operates a mouse cursor 621 to transmit the information to the query input unit 110 in the image retrieval device 104. In the example of FIG. 6, first, the user inputs an image of a first substance (Object_A) on the upper left of a canvas (602). At this time, when accepting the input of the first substance (Object_A), the query input unit 110 obtains arrangement information (a size and coordinates) of the first substance (Object_A).

The co-occurrence information creation unit 111 in the image retrieval device 104 obtains the information on the corresponding substance from the image database 109 using the image of the first substance (Object_A) input to the canvas 602 and the arrangement information. As described above, the method for inputting the query may be a keyword by a text or an audio. For example, the following four methods are possible as the image retrieval method at this time.

(1) In the case of the query being an image, the retrieval is performed with the image feature value.
(2) In the case of the query being the image, a substance category is estimated and the retrieval is performed conditioning the category.
(3) In the case of the query being a keyword, the retrieval is performed using the keyword as a condition for the category.
(4) In the case of the query being the keyword, conversion into an image is performed using the conversion table and the retrieval is performed with the image feature value.

To achieve the above-described image retrieval method, the co-occurrence information creation unit 111 may use the functions of the feature value extraction unit 107 and the category estimation unit 108. This allows extraction of the image feature value from the query and estimation of the category.

The retrieval results can be obtained in a similar format by any of the retrieval methods (1) to (4). That is, the co-occurrence information creation unit 111 can retrieve a certain specific substance (here, Object_A) in FIG. 3B by the above-described retrieval methods. The co-occurrence with another substance when the first substance (Object_A) is input on the upper left is estimated using the retrieval results.

Figure 7:
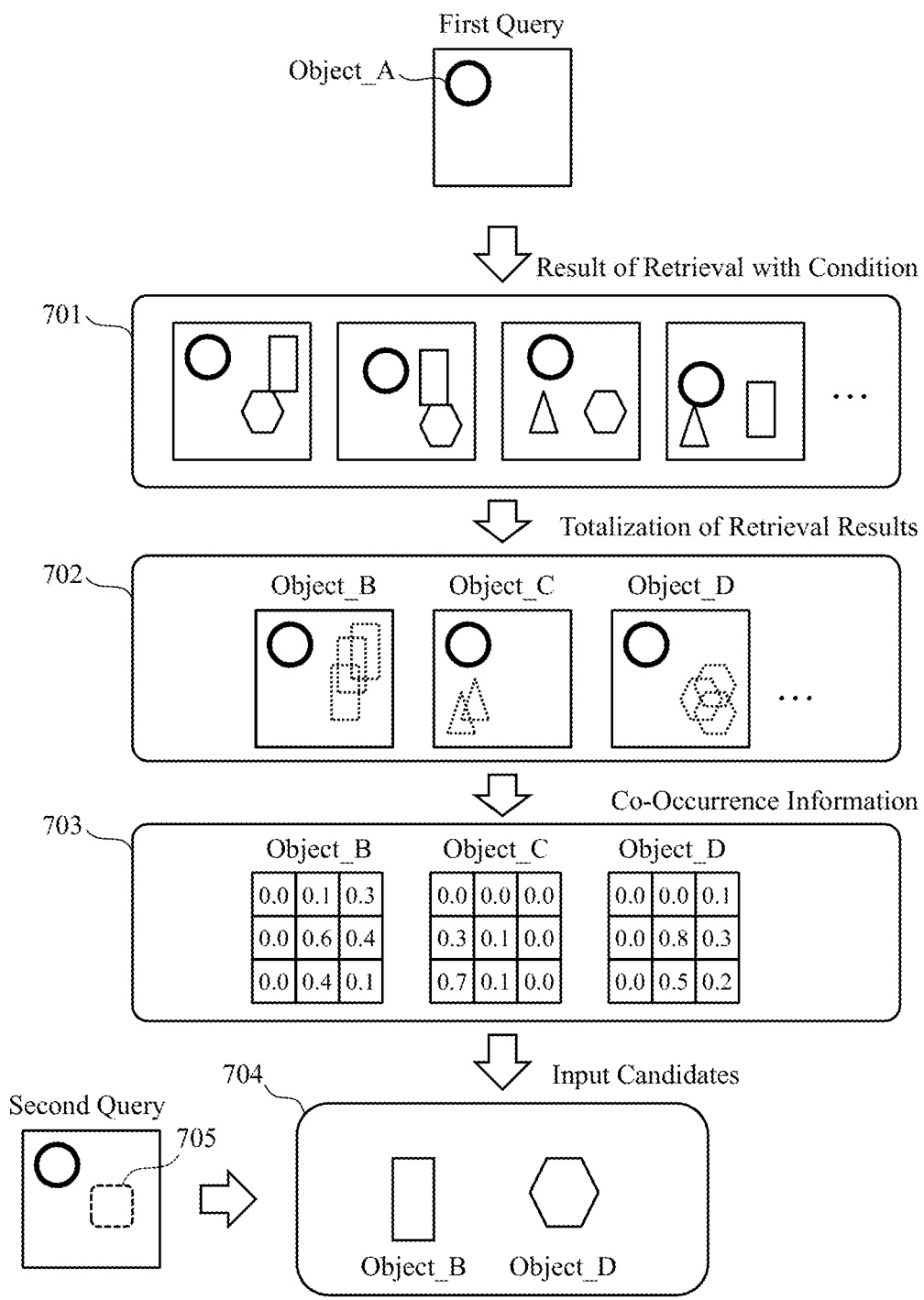
FIG. 7 is a drawing explaining an example of creation of the co-occurrence information according to Embodiment 1.

FIG. 7 is a drawing expressing a procedure to create the co-occurrence information from the retrieval results. Here, it is assumed that the co-occurrence information creation unit 111 performs the retrieval on the image database 109 using the first query in which the image of the first substance (Object_A) is arranged on the upper left of the canvas. By performing a narrow search using the first query including the substance and the arrangement information of the substance allows obtaining a plurality of images similar to the conditions of the first query, that is, a plurality of images in which the similar substance is present at the similar location (701).

The co-occurrence information creation unit 111 obtains the arrangement information of other substances included in the plurality of images obtained as a result of retrieval with condition 701. Then, the co-occurrence information creation unit 111 totalizes the categories of the other obtained substances for each category (702). For example, the co-occurrence information creation unit 111 divides the image into a plurality of regions and counts the counts of appearances of the other substances in each region. At this time, in the case where the substance is arranged across the plurality of regions, the count of appearances of the substance may be counted in the plurality of regions. The count of appearances may be weighted for counting such that the value becomes large as the value is close to the central coordinates of the substance.

The co-occurrence information creation unit 111 normalizes the totalized results by, for example, dividing the results by the count of whole appearance to create maps of the co-occurrence information (hereinafter referred to as co-occurrence maps) (703). The co-occurrence map expresses a correlation relationship between the first substance (Object_A) and another substance based on the image database 109. In the example of FIG. 7, the co-occurrence information creation unit 111 divides the image into nine regions and calculates the count of appearances (here, the normalized value) in each region of the target category. In the example of FIG. 7, the co-occurrence map is created for each category of the substances (Object_B, Object_C, and Object_D). The co-occurrence map only needs to include the space information, which indicates that another substance appears at which region in the image regarding a certain substance, is not limited to the format of FIG. 7.

The query candidate estimation unit 112 displays categories with relatively large values and positions in these co-occurrence maps on the display device 103 as candidates for query (candidates for the second substance). After the location of the second query is designated by the user, the query candidate estimation unit 112 may present categories with a high value in the limited region as the candidates for query. In the example of FIG. 7, when the user designates a dotted line region 705 in the second query, the query candidate estimation unit 112 displays the substances (Object_B and Object_C), which have the large values at the corresponding regions in the co-occurrence maps, on the display device 103 (704).

Returning to the explanation of FIG. 6, the user selects the location of the second query by the mouse cursor (603). The query candidate estimation unit 112 displays the categories of the substances with the high probability of presence in the corresponding region in a pop-up display as a list of query candidates using the occurrence maps obtained by the above-described process (604). The display method may be category names or may be images.

When a desired substance is present in the query candidate list displayed in the pop-up display, the user selects the substance. The query input unit 110 adds the selected substance to the canvas as the second substance (Object_B) (605). When the desired substance is not found from the query candidate list, the user may manually input the substance similar to the first query. Additionally, after adding the new substance to the canvas, the user may adjust the arrangement of the substance. When the first substance (Object_A) or the second substance (Object_B) is input, the query input unit 110 may accept an input of a background image. In this case, the canvas displays the background image. Composition of the background when the substance is input ensures enhancing accuracy of the similar image retrieval.

When accepting the input of the second substance (Object_B), the query input unit 110 obtains the arrangement information (the size and the coordinates) of the second substance (Object_B). Using the first query (the first substance (Object_A) and the arrangement information of the first substance (Object_A)) and the second query (the second substance (Object_B) and the arrangement information of the second substance (Object_B)), the co-occurrence information creation unit 111 obtains a second co-occurrence map indicating a correlation relationship with both the first substance and the second substance based on the image database 109. The query candidate estimation unit 112 outputs candidates for a third substance based on the second co-occurrence map to the display device 103. With this configuration, the candidates for the third substance are related to both the first substance and the second substance, thereby enhancing accuracy of the created retrieval query.

In the above-described example, when the second query is input, the second co-occurrence map indicates the correlation relationship with both the first substance and the second substance; however, this should not be constructed in a limiting sense. For example, after accepting the input of the second substance (Object_B), the co-occurrence information creation unit 111 may obtain the second co-occurrence map indicating the correlation relationship with the second substance based on the image database 109 using the second query (the second substance (Object_B) and the arrangement information of the second substance (Object_B)). With this configuration, many substances are presented as the candidates for the third substance further; therefore, the user can select the appropriate third substance from the many candidates.

Repeating the above-described operation creates the canvas (the retrieval query) including the plurality of substances and the arrangement information of the substances (606). Here, the retrieval query in which the first substance (Object_A), the second substance (Object_B), and the third substance (Object_C) are arranged on the canvas 601 is obtained. In the case where the next query is estimated while the plurality of queries are input, the image retrieval may be performed using all queries that have been already input as the condition. However, there may be a case where an image matching the condition is not sufficiently found and therefore the creation of the co-occurrence information fails. Therefore, as described above, only the query input most recently may be used or only the query designated by the user may be used.

The image retrieval unit 113 performs the similar image retrieval using the canvas obtained as described above to obtain a final retrieval result (607). As one example of the similar image retrieval, the image retrieval unit 113 may regard the canvas as a composite image formed of a plurality of substances, extract the feature value of the whole image, and perform the retrieval on the image database 109 using the feature value. Additionally, after performing the retrieval with each query (the substance and the arrangement information) on the canvas, the image retrieval unit 113 may integrate these retrieval results.

Figure 8:
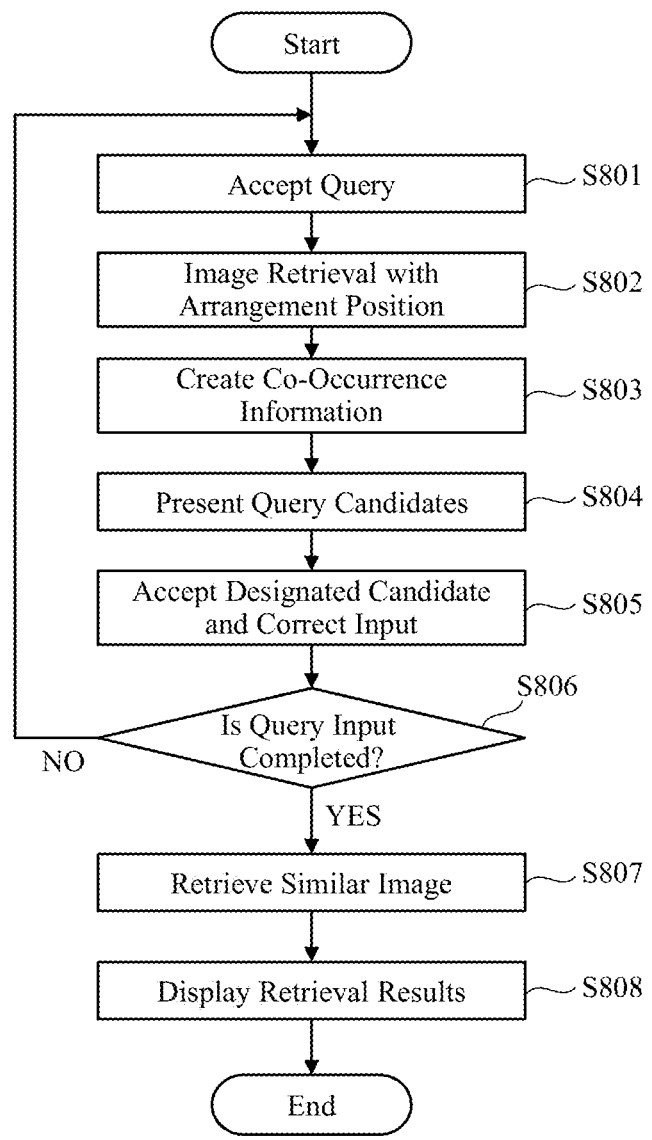
FIG. 8 is an example of a flowchart for processes of the query input assistance and the image retrieval using the co-occurrence information according to Embodiment 1.

FIG. 8 is a drawing expressing a process flow for the image retrieval using the query input assistance based on the co-occurrence information. The following explains each step of FIG. 8.

The query input unit 110 accepts the query input by the user (S801). The query is the information expressing the image of the substance and the arrangement of the substance. For example, as described in the explanation of FIG. 6, the query is input using the canvas displayed on the display device 103.

The co-occurrence information creation unit 111 extracts the feature value from the image of the substance of the query input at Step S801 and retrieves the similar images from the image database 109 (S802). At this time, the co-occurrence information creation unit 111 narrows down the retrieval results by conditioning the substance input at Step S801 and the arrangement information of the substance.

The co-occurrence information creation unit 111 creates the co-occurrence information from the similar image retrieval results obtained at Step S802 (S803). Details of the creation process flow for the co-occurrence information will be described later as the explanation of FIG. 9.

The query candidate estimation unit 112 estimates a query input by the user next from the co-occurrence information obtained at Step S803 and displays them on the display device 103 (S804). The method for estimating the query is as explained in FIG. 7.

The query input unit 110 accepts the query selected by the user among the query candidates presented at Step S804 (S805). Additionally, the query input unit 110 may accept a change instruction of the image and the arrangement of the query from the user and change the query displayed on the display device 103 in response to this instruction. The query input unit 110 may accumulate logs of selections and corrections by the user in the storage device 202. The query input unit 110 may use the accumulated logs for the candidate presentation at the next time. The query input unit 110 may, for example, preferentially display the query candidates selected by many users.

When receiving a notification of query input completion from the user (S806: YES), the image retrieval device 104 terminates the query input and advances the process to Step S807. If not so (S806: NO), the image retrieval device 104 returns the process to Step S801 and accepts the next query.

The image retrieval unit 113 retrieves the similar images from the image database 109 using the retrieval query obtained through a repetition from Step S801 to Step S805. The image retrieval unit 113 may perform the retrieval on the image table 300 using an image obtained by composition of a plurality of substance images or may integrate results of the retrieval on the substance table 310 using each substance image. The detailed process flow will be described later as the explanation of FIG. 10.

The image retrieval unit 113 displays the retrieval results on the display device 103 and terminates the retrieval process (S880).

Figure 9:
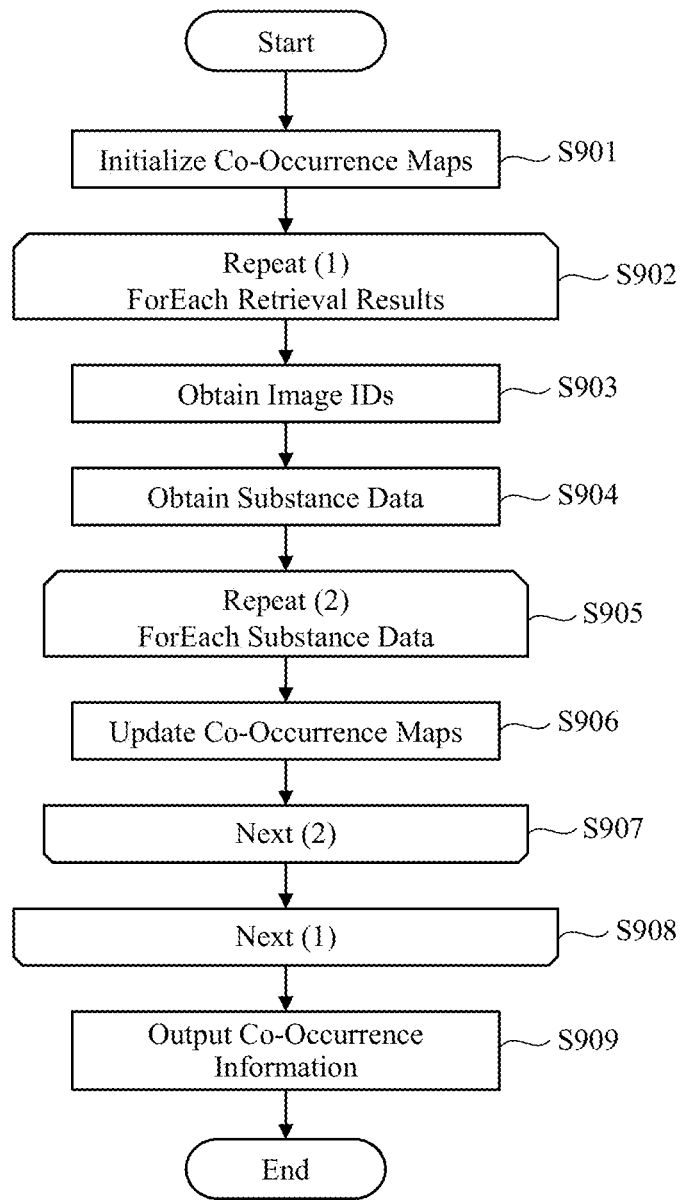
FIG. 9 is an example of a flowchart for a process of the co-occurrence information creation according to Embodiment 1.

FIG. 9 is process flow to create the co-occurrence information from the image retrieval results and is equivalent to Step S803 of FIG. 8. The following explains each step of FIG. 9.

The co-occurrence information creation unit 111 initializes the co-occurrence maps (S901). The co-occurrence map is a map expressing the co-occurrence of the substance in each region as explained in 703 of FIG. 7. The co-occurrence map is prepared for each category of the substance.

The co-occurrence information creation unit 111 repeats processes from Step S903 to Step 907 for each retrieval result obtained at Step S802 in FIG. 8 (a loop from S902 to S908).

The co-occurrence information creation unit 111 obtains the image IDs 312 of the substances included in the images as the retrieval results each obtained at Step S802 of FIG. 8 from the substance table 310 (S903).

The co-occurrence information creation unit 111 obtains substance data (here, records of the substance table 310) corresponding to the image IDs 312 obtained at Step S903 from the image database 109 (S904).

The co-occurrence information creation unit 111 repeatedly performs Step S906 on each substance data obtained at Step S904 (a loop from S905 to S907).

The co-occurrence information creation unit 111 obtains the categories and the arrangement information of the substances from the substance data and updates the co-occurrence maps of the corresponding categories in accordance with the arrangement information (S906). As described later as the explanation of FIG. 10, the update method adds a value to, for example, one or more regions of the appearance location(s).

The co-occurrence information creation unit 111 outputs the co-occurrence map of each category as the co-occurrence information (S909). When necessary, the co-occurrence information creation unit 111 may normalize the values in the co-occurrence maps using the whole appearance frequency or a similar value.

The image retrieval, the data acquisition, and the data totalization need to be performed many times for creation of the co-occurrence maps; therefore, a calculation load is high. Accordingly, a count of data acquisitions may be restricted according to the system requirements and the created co-occurrence information may be cached.

Figure 10:
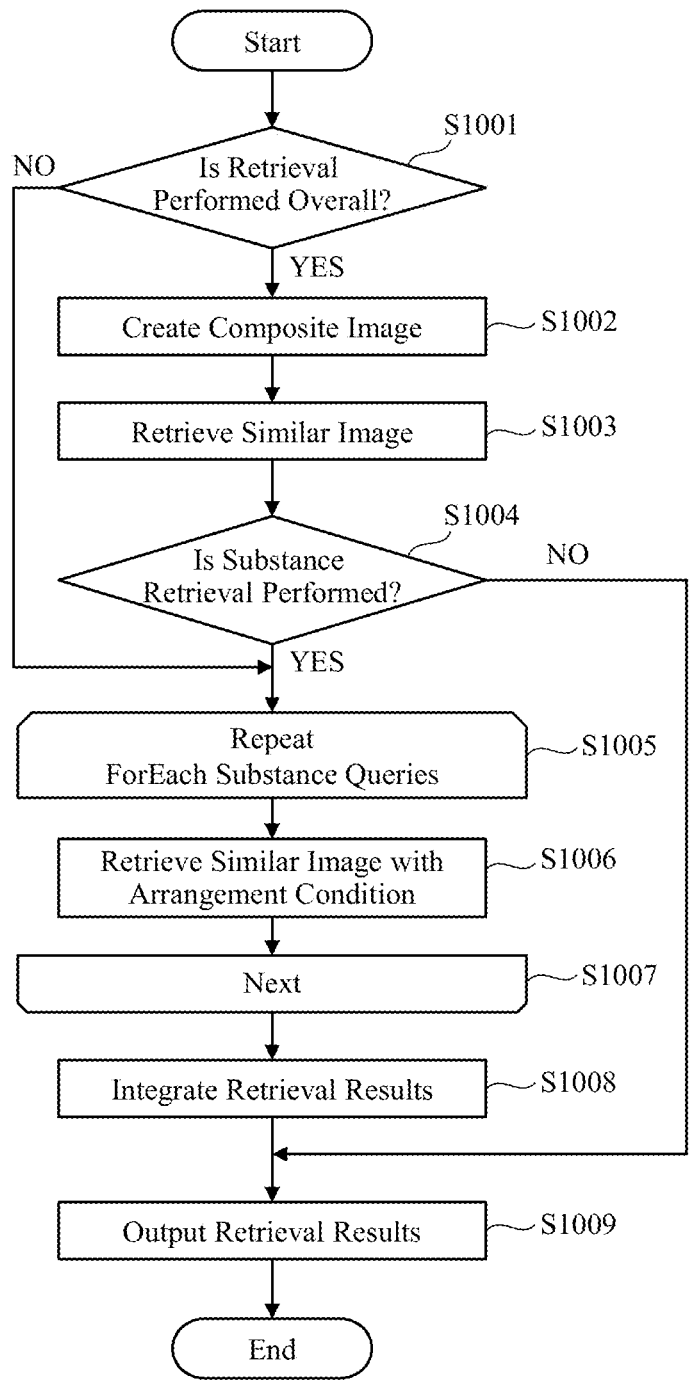
FIG. 10 is an example of a flowchart for a process of the image retrieval according to Embodiment 1.

FIG. 10 is a process flow for the image retrieval using a plurality of input substances and is equivalent to Step S807 of FIG. 10. The following explains each step of FIG. 10.

When receiving an instruction to perform the retrieval using the whole image from the user (S1001: YES), the image retrieval unit 113 advances the process to Step S1002. If not so (S1001: NO), the image retrieval unit 113 advances the process to Step S1005.

The image retrieval unit 113 creates one image (a composite image) in accordance with the plurality of input queries (S1002). That is, the image retrieval unit 113 synthesizes the plurality of input substances in accordance with the arrangement information of these substances to create the one image (the composite image). For example, for simple explanation, it is assumed that the instruction for retrieval is received in the state of 605 in FIG. 6. In this case, the image retrieval unit 113 creates a composite image including the first substance (Object_A) and the second substance (Object_B). The image retrieval unit 113 may synthesize a background image and may add image processing so as to be naturally synthesized as necessary.

The image retrieval unit 113 extracts the feature values from the composite image created at Step S1002 and retrieves the similar images from the image table 300 (S1003). The feature values are extracted by the algorithm identical to the algorithm during the registration in the image database 109.

When receiving the instruction to perform the retrieval of each substance from the user (S1004: YES), the image retrieval unit 113 advances the process to Step S1005. If not so (S1004: NO), the image retrieval unit 113 advances the process to Step S1009.

The image retrieval unit 113 performs Step S1006 for each substance included in the plurality of input queries (1005).

The image retrieval unit 113 extracts the feature value from the image of each substance and performs the similar image retrieval conditioning the arrangement information on the substance table 310 (1006). For example, for simple explanation, it is assumed that the instruction to retrieval is received in the state of 605 in FIG. 6. In this case, the image retrieval unit 113 performs the similar image retrieval using the first query (the first substance (Object_A) and the arrangement information of the first substance (Object_A)) and then performs the similar image retrieval using the second query (the second substance (Object_B) and the arrangement information of the second substance (Object_B)). At this time, the image retrieval unit 113 integrates the retrieval results of the first query with the retrieval results of the second query. As one example of the integration method, degrees of similarity of the plurality of retrieval results of the identical image ID may be added.

The feature values during the image retrieval are extracted by the algorithm identical to the algorithm during the registration in the image database 109. The retrieval results of the substance table 310 are obtained as the substance data (in units of records of the substance table 310). Accordingly, the image retrieval unit 113 obtains the image data from the image table 300 based on the image ID 312 of each record in the substance table 310.

The retrieval may be performed with conditions different depending on the substance at the retrieval. For example, the feature value may be switched for each substance such that a feature value catching a rough shape is used for a small-size substance on a canvas and a detailed texture feature is used for a large substance. For example, for simple explanation, it is assumed that the instruction to retrieval is received in the state of 605 in FIG. 6. In this case, the image retrieval unit 113 may perform the similar image retrieval while switching the feature values used during the retrieval of the image database 109 between the first query and the second query based on the size of the first substance (Object_A) and the size of the second substance (Object_B).

As another example, the image retrieval unit 113 may perform the similar image retrieval while weighting each of the plurality of substances based on the input orders of the plurality of substances. In this case, the retrieval of the substance with an early input order may be weighted larger. For example, for simple explanation, it is assumed that the instruction to retrieval is received in the state of 605 in FIG. 6. In this case, the image retrieval unit 113 may weight the first query and the second query based on the input orders of the first substance (Object_A) and the second substance (Object_B), and, for example, the first query with the early input order may be weighted larger. Additionally, not only based on the input orders, but the weighting may be performed by designation on which substance that the user puts emphasis in the retrieval.

The image retrieval unit 113 integrates the retrieval results obtained at Step S1003 and the retrieval results obtained at Step S1006 in units of the image IDs (S1008). For example, the image retrieval unit 113 may add the degrees of similarity of the plurality of retrieval results of the identical image ID to integrate the values into one retrieval result.

The image retrieval unit 113 sorts the retrieval results in the order of degree of similarity and outputs the retrieval results to the display device 103 (S1009).

FIG. 11A is a drawing illustrating a configuration example of an operation screen (an image retrieval interface) for image retrieval using the image retrieval device 104 according to this embodiment. The operation screen is, for example, presented to the user on the display device 103. The user, for example, uses the input device 102 and operates the cursor displayed on the screen to give instructions of processes to the image retrieval device 104. While the example of FIG. 11A is a stationary operation terminal, as long as the device can perform the input and the display, various configurations can be employed for the device. For example, a touch operation may be used like a smart phone and a tablet. For example, a head mounted display and a glass type device that can display information may be used as the display device 103 and an input device accepting an audio input and a gesture may be used. Since efficiency requested for the input of the retrieval query in the use of such wearable device and portable device compared with a stationary computer, the query input assistance of this embodiment is effective.

The operation screen includes, for example, a query input region 1101, a query candidate display region 1102, a retrieve button 1103, a retrieval option display region 1104, and a retrieval result display region 1105.

The information displayed on the query input region 1101 is output to the display device 103 by, for example, the query input unit 110. The information displayed on the query candidate display region 1102 is output to the display device 103 by, for example, the query candidate estimation unit 112. The information displayed on the retrieval result display region 1105 is output to the display device 103 by, for example, the image retrieval unit 113.

First, the user designates an image serving as a clue for the retrieval. The operation screen, for example, may display a dialogue to select the registered image or may include an interface to input an external image. As described above in the explanation of FIG. 1, the keyword may be input with the text or the audio. The user designates that the image is arranged to which part on the query input region 1101. The query input region 1101 displays the input image (here, the image of the car) at the designated position.

The co-occurrence information creation unit 111 creates the co-occurrence information in accordance with the input image and the arrangement information. When the user designates a region 1100 for the next query in the query input region 1101, the query candidate estimation unit 112 displays query candidates in the query candidate display region 1102 in accordance with the created co-occurrence information. Before the user designates the region for the next query, the co-occurrence information creation unit 111 may perform an overlay display of the candidates of the substances and the arrangement information on the query input region 1101 such that the user selects a substance.

When the user selects the substance from the query candidate display region 1102, the image of the selected substance is displayed on the region 1100 in the query input region 1101. By repeatedly performing this operation, the images of the plurality of substances are arranged in the query input region 1101.

The query candidate display region 1102 may include an interface such that an unnecessary substance can be removed from the query candidates. This allows the user to create the retrieval query with only the desired query candidates displayed.

When finishing the inputs of all substances, the user clicks the retrieve button 1103. At this time, a retrieval option may be designated from the retrieval option display region 1104 such that an operation inside the image retrieval unit 113 is switched. For example, when "Retrieval by Whole Image" is selected in the retrieval option display region 1104, the image retrieval unit 113 creates the composite image and performs the similar image retrieval (Steps S1002 and S1003 in FIG. 10). When "Retrieval by Each Substance" is selected in the retrieval option display region 1104, the image retrieval unit 113 performs the similar image retrieval with the arrangement condition for each substance (Steps S1005 to S1007 in FIG. 10) and integrates these retrieval results (Step S1008 in FIG. 10).

The image retrieval unit 113 performs the similar image retrieval matching the conditions input to the Query input region 1101 on the image database 109. The retrieval results are, for example, sorted in the order of the degree of similarity and the retrieval results having the identical image ID are consolidated, thus displaying the retrieval results on the retrieval result display region 1105. As the display method of the retrieval results, not displaying the similar images in a list but, for example, an interface where the similar images are synthesized and displayed on the query input region 1101 and every time the query is updated, the retrieval results become gradually close to a desired image may be configured.

Figure 11B:
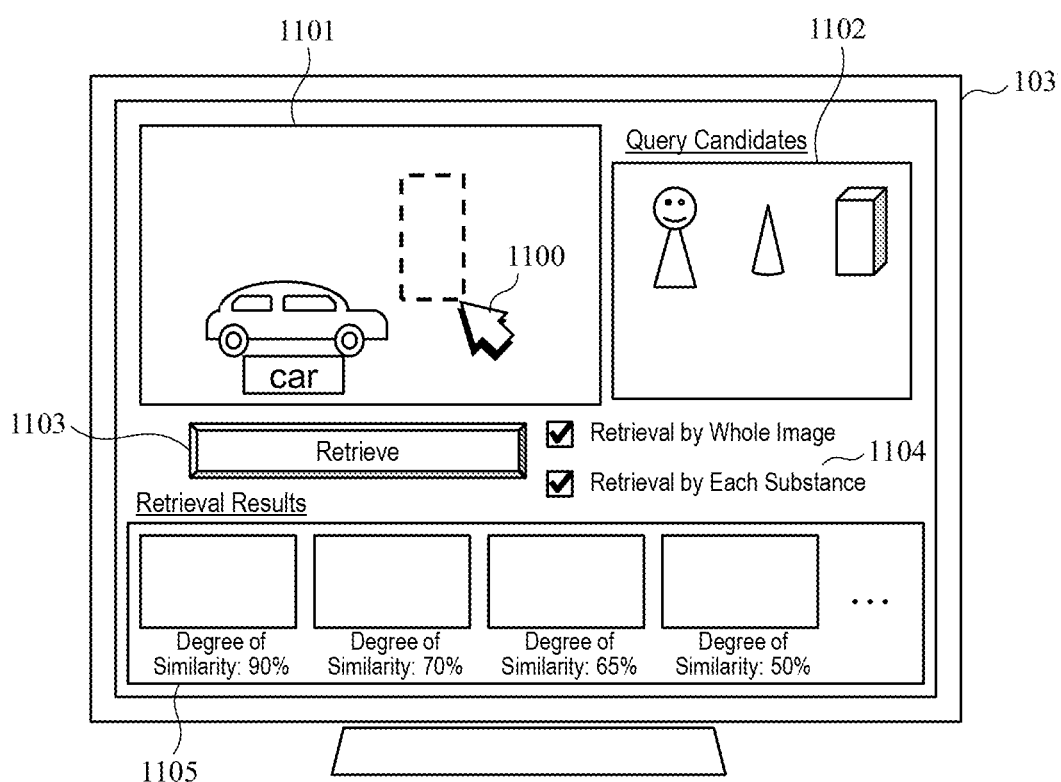
FIG. 11B is a drawing illustrating an example of the image retrieval interface according to Embodiment 1 and illustrates the image retrieval interface when an arrangement of the substance is changed.

FIG. 11B illustrates the operation screen (the image retrieval interface) when the arrangement of the substance is changed. The query input region 1101 includes an interface that can change the arrangement information of the arranged substance. For example, the user can designate the substance by the cursor to change at least one of the size and the position of the substance. Here, it is assumed that the position of the car in the query input region 1101 is changed. For example, when receiving the change in the position of the car in the query input region 1101, the query input unit 110 obtains the changed arrangement information of the car.

The co-occurrence information creation unit 111 uses the car and the changed arrangement information to calculate the co-occurrence information (the co-occurrence map) again. The co-occurrence information creation unit 111 displays the query candidates based on the re-calculated co-occurrence information on the query candidate display region 1102. In the example of FIG. 11B, the change in the arrangement of the car in the query input region 1101 changes the kind and the display order of the plurality of query candidates displayed on the query candidate display region 1102. This configuration allows real-time presentation of the query candidates according to the change in the query by the user.

FIG. 12 is a sequence diagram explaining one example of processes by the image retrieval system 100 according to this embodiment. Specifically, FIG. 12 illustrates a process sequence between a user 1200, the image storage device 101, a calculator 1201, and the image database 109 in the above-described image registration and image retrieval processes by the image retrieval system 100. The calculator 1201 is a calculator achieving the image retrieval device 104. The user 1200, for example, transmits a request and an instruction and inputs data to the calculator 1201 via the input device 102 and receives a presentation such as process results from the calculator 1201 via the display device 103.

S1210 indicates the registration process and S1220 indicates the retrieval process in FIG. 12. The registration process S1210 includes processes indicated by Step S1211 to Step S1218.

When the user 1200 outputs a registration request (S1211), the calculator 1201 outputs an image data acquisition request to the image storage device 101 (S1212) and obtains the image data from the image storage device 101 (S1213). The processes of Step S1214 to Step S1217 described below are equivalent to a sequence of the registration processes explained in FIG. 5. The calculator 1201 detects substances from the obtained image, extracts a feature value from each region of the substance, and estimates a category (S1214 to S1216). Additionally, the feature value extraction extracts a feature value of the whole image. The image data, the feature value of the whole image, the substance detection results (such as coordinate information, a width, and a height of the substance), the feature values of the substances, and the categories of the substances obtained from the results are registered in the image database 109 (S1217). At the termination of the registration process, the calculator 1201 notifies the user 1200 of the completion of the registration (S1218).

The retrieval process S1220 includes the processes indicated by Step S1221 to Step S1229 and is equivalent to a sequence of the retrieval processes explained in FIG. 8.

When the user 1200 inputs the query to the calculator 1201 (S1221), the calculator 1201 retrieves the image from the image database 109 in accordance with the conditions of the input query and creates the co-occurrence information from the retrieval results (S1223). The calculator 1201 estimates a query input by the user 1200 next from the created co-occurrence information and presents the queries to the user 1200 (S1224 and S1225). The user 1200 corrects the input query or selects the query from the candidates and transmits the query to the calculator 1201 (S1226). Repeatedly performing a sequence of the process at S1222 creates the retrieval query in which the plurality of substances are arranged.

When the user 1200 outputs a retrieval request, the calculator 1201 retrieves the similar images from the image database 109 using the input retrieval query (S1227 and S1228). The calculator 1201 sorts the obtained retrieval results in the order of the degree of similarity and presents the retrieval results to the user 1200 (S1229). At this time, the calculator 1201 may consolidate the retrieval results having the identical image ID and present the retrieval results to the user 1200.

When retrieving the image including the plurality of substances, the image retrieval device 104 according to this embodiment predicts and presents the substances to be input next from the substance input by the user first. More specifically, the image retrieval device 104 can propose the candidates for the second substance having the correlation relationship with the first substance as the input of the retrieval query leading to high retrieval accuracy when retrieving the image including the plurality of substances. This allows enhancing the input efficiency of the retrieval query by the user.

The image retrieval device 104 according to this embodiment can arrange the plurality of substances in the retrieval query in accordance with the co-occurrence of the substances including the space information; therefore, the retrieval query with the appropriate arrangement can be created. Consequently, the retrieval accuracy can be enhanced.

Embodiment 2

To create the co-occurrence information described in Embodiment 1, as described in the explanation of FIG. 7, the image including the first query is obtained by the retrieval with the condition of the arrangement information. The co-occurrence information creation unit 111 totalizes an appearance frequency of another image included in the obtained image in each region to create the co-occurrence map. However, if the image database 109 does not sufficiently accumulate the images, there is a possibility that a count of images matching the arrangement condition is small and therefore the useful co-occurrence information fails to be obtained. Therefore, Embodiment 2 explains an example where the narrowing-down with the arrangement condition is not performed and a large number of samples are obtained by performing a position correction after retrieving the image including the substance of the first query.

Figure 13:
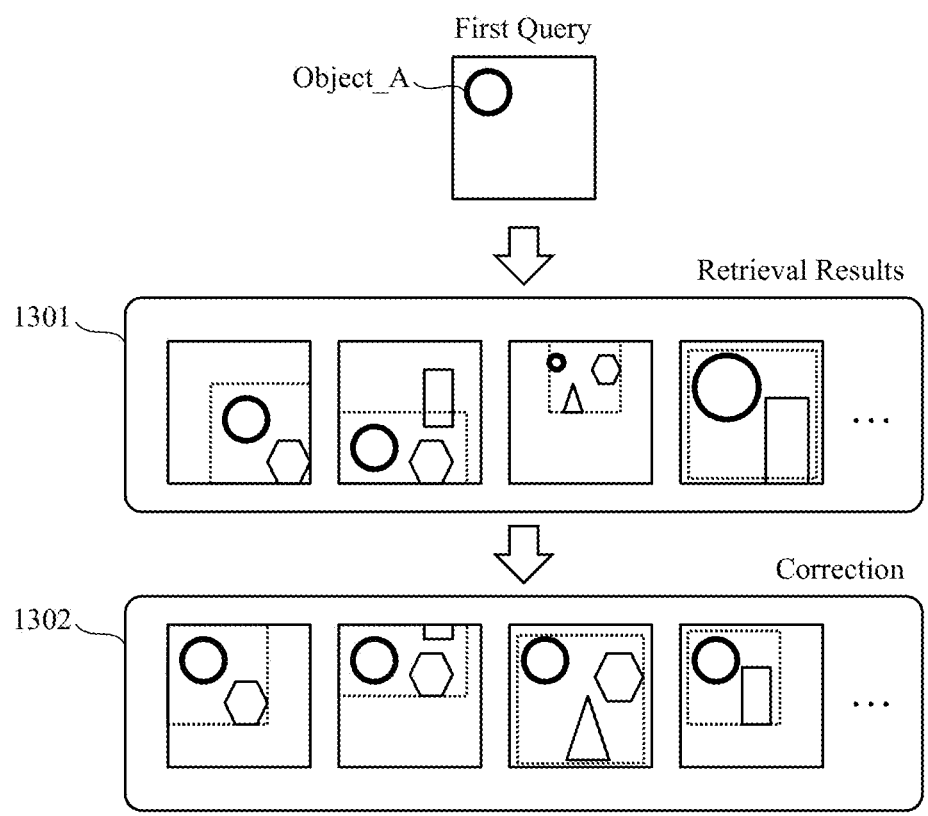
FIG. 13 is a drawing explaining a correction process on an image obtained by a retrieval result according to Embodiment 2.

FIG. 13 is a drawing expressing the position corrections of the retrieval results. The co-occurrence information creation unit 111 performs the retrieval on the image database 109 without the use of the arrangement information in the first query as the condition. The retrieval without conditioning the arrangement information ensures obtaining images in which the first substance (Object_A) of the first query appears at a different region and images in which the first substance (Object_A) of the first query with a different size appears (1301).

The co-occurrence information creation unit 111 corrects the image of the retrieval result according to the position and the size of the substance of the input first query (1302). That is, the co-occurrence information creation unit 111 corrects the image such that the first substance (Object_A) in the image obtained by the retrieval (1301) matches the arrangement information of the first query. This correction process may include various processes such as an enlargement, a reduction, a rotation, an inversion, and a parallel movement. Note that it is not necessary that the correction process here corrects the first substance (Object_A) in the image obtained by the retrieval (1301) such that the first substance (Object_A) completely matches the arrangement information of the first query. The first substance (Object_A) only needs to be corrected to the extent similar to the arrangement information of the first query. In the example of the correction process of FIG. 13, the images after correction become the images in which the first substance (Object_A) has the size identical to that of the first query and is arranged at the position identical to that of the first query. In this embodiment, the co-occurrence information creation unit 111 creates the co-occurrence maps between the first substance (Object_A) of the first query and other substances using the corrected images after such correction is performed.

Figure 14:
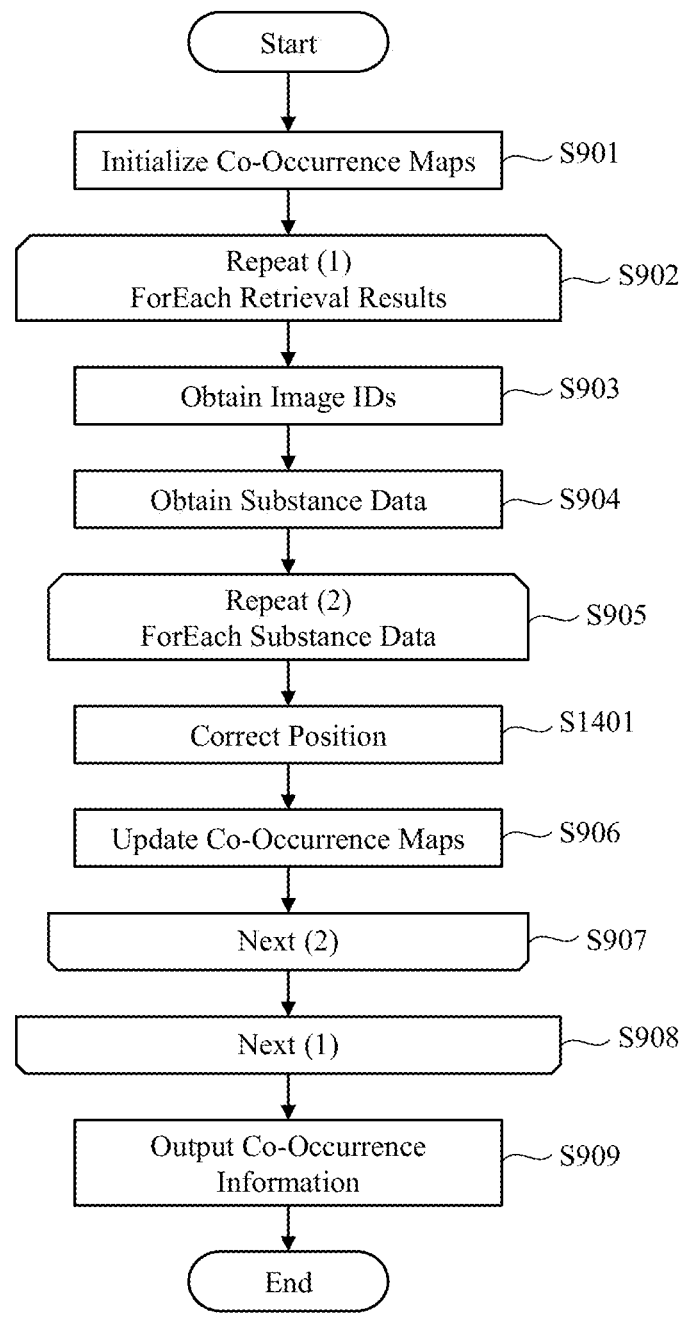
FIG. 14 is an example of a flowchart for a process of co-occurrence information creation according to Embodiment 2.

FIG. 14 is a process flow for the co-occurrence information creation to which the position correction is introduced. Since the basic process flow is similar to that of FIG. 9, reference numerals identical to those of FIG. 9 are assigned for the identical processes and the explanations are omitted. Note that the retrieval process (S802 of FIG. 8) performed before the processes of FIG. 14 performs the retrieval without the use of the arrangement information as the condition. As illustrated in FIG. 14, after obtaining the substance data, the co-occurrence information creation unit 111 obtains the information on the size and the arrangement of the substance in the first query to correct the position of each substance of the images obtained at S802 of FIG. 8. The co-occurrence information creation unit 111 updates the co-occurrence map using the corrected positional relationship of each substance (S906).

The above-described processes ensure obtaining the useful co-occurrence information even when the image database 109 does not sufficiently accumulate the images. Especially as illustrated in 1302 in FIG. 13, although the arrangement information of each substance is possibly changed by the correction process, since the co-occurrence between the substance of the first query and another substance is maintained, the useful co-occurrence information can be obtained. As the result, the image retrieval device 104 can propose the candidates for the second substance having the correlation relationship with the substance of the first query.

The above-described correction process may be performed by designation by the user or may be automatically performed by the image retrieval device 104. For example, when the image database 109 is smaller than a predetermined amount of accumulation, the image retrieval device 104 may determine the amount of accumulation and automatically perform the correction process. As another example, when a count of substances that can be obtained as the candidates for the second substance is smaller than the predetermined count, the image retrieval device 104 may determine the count of substances, automatically perform the correction process, and present the candidates for the second substance again.

The present invention is not limited to the above-described embodiments and includes various modifications. The embodiments are explained in detail for easy understanding of the description of the present invention, and do not necessarily include all the explained configurations. A part of the configuration of one embodiment can be replaced by the configuration of another embodiment. The configuration of one embodiment can be used with the addition of the configuration of another embodiment. For a part of the configurations in the respective embodiments, another configuration can be added, deleted, or replaced.

While the above-described examples explain the image retrieval, the present invention is also applicable to the retrieval of a moving image. For example, as described above, the moving image data is accumulated in the image database as a collection of the frames (the still image data format). Accordingly, the image retrieval unit 113 may retrieve a frame of a moving image similar to the retrieval query explained above to achieve the retrieval of the moving image.

The above-described respective configurations, functions, processing units, processing means, or similar specifications may be achieved by hardware, for example, a part of or all of which are designed with, for example, an integrated circuit. For example, the above-described respective configurations and functions may be achieved by software with which the processor interprets and executes the programs achieving the respective functions. A various kinds of non-transitory computer readable medium can memorize information such as the programs achieving the respective functions, the tables, and the files. As the non-transitory computer readable medium, for example, a flexible disk, a CD-ROM, a DVD-ROM, a hard disk, an optical disk, a magneto-optical disk, a CD-R, a magnetic tape, a non-volatile memory card, and a ROM are used.

In the above-described embodiments, control lines and information lines considered necessary for the explanation are described. Not all the control lines and the information lines on the product are necessarily described. All configurations may be mutually coupled.

REFERENCE SIGNS LIST

100 Image retrieval system
101 Image storage device
102 Input device
103 Display device
104 Image retrieval device
105 Image input unit
106 Substance detector
107 Feature value extraction unit
108 Category estimation unit
109 Image database
110 Query input unit
111 Co-occurrence information creation unit
112 Query candidate estimation unit 113 Image retrieval unit
201 Processor
202 Storage device
203 Processing program
204 Network interface device
300 Image table
310 Substance table

The invention claimed is:

1. An image processing device comprising:
a processor;
a storage unit coupled to the processor, the storage unit storing an image database; and
a display unit coupled to the processor,
wherein the processor:
obtains arrangement information of each of a plurality of objects on the display unit when the processor accepts an input of a first object of the plurality of objects via the display unit;
calculates a total number of each of the plurality of objects based on the arrangement information obtained;
calculates first co-occurrence information using the first object, the arrangement information of the first object, and the arrangement information of the plurality of objects, the first co-occurrence information indicating a correlation relationship with the first object based on the image database;
outputs at least one of the plurality of objects based on the first co-occurrence information to the display unit;
receives a user input including a location for a second object; and
suggests at least one candidate for the second object based on the user input and the output of the at least one of the plurality of objects.

2. The image processing device according to claim 1, wherein the arrangement information includes a size and location information of the first object.

3. The image processing device according to claim 1, wherein the first co-occurrence information expresses a probability of an appearance of another object when the first object is present at a certain region in an image for each region.

4. The image processing device according to claim 1, wherein the processor:
obtains arrangement information of the second object on the display unit when the processor accepts an input of the second object via the display unit;
obtains second co-occurrence information using the first object, the arrangement information of the first object, the second object, and the arrangement information of the second object, the second co-occurrence information indicating a correlation relationship with both of the first object and the second object based on the image database; and
outputs a candidate for a third object based on the second co-occurrence information to the display unit.

5. The image processing device according to claim 1, wherein the processor:
obtains arrangement information of the second object on the display unit when the processor accepts an input of the second object via the display unit;
obtains second co-occurrence information using the second object and the arrangement information of the second object, the second co-occurrence information indicating a correlation relationship with the second object based on the image database; and
outputs a candidate for a third object based on the second co-occurrence information to the display unit.

6. The image processing device according to claim 1, wherein
the processor:
creates a composite image including the first object and the second object when the processor accepts an instruction for an image retrieval using a retrieval query via the display unit, the retrieval query including the first object, the arrangement information of the first object, the second object, and arrangement information of the second object; and
retrieves an image similar to the retrieval query using the composite image from the image database and displays a retrieval result on the display unit.

7. The image processing device according to claim 6, wherein the processor is further configured to:
retrieve an image similar to a first query including the first object and the arrangement information of the first object from the image database;
retrieve an image similar to a second query including the second object and the arrangement information of the second object from the image database; and
integrate a retrieval result by the composite image, a retrieval result by the first query, and a retrieval result by the second query and display an integrated result on the display unit.

8. The image processing device according to claim 1, wherein the processor:
retrieves an image similar to a first query including the first object and the arrangement information of the first object from the image database and retrieves an image similar to a second query including the second object and arrangement information of the second object from the image database when the processor accepts an instruction for an image retrieval using a retrieval query including the first object, the arrangement information of the first object, the second object, and the arrangement information of the second object via the display unit; and
integrates a retrieval result by the first query and a retrieval result by the second query and displays an integrated result on the display unit.

9. The image processing device according to claim 8, wherein the processor is configured to switch feature values used to retrieve the image database between the first query and the second query based on a size of the first object and a size of the second object.

10. The image processing device according to claim 8, wherein the processor is configured to weight the first query and the second query based on input orders of the first object and the second object.

11. The image processing device according to claim 1, wherein the processor:
re-calculates the first co-occurrence information using the first object and changed arrangement information of the first object when the arrangement information of the first object is changed; and
outputs a candidate for the second object based on the re-calculated first co-occurrence information to the display unit.

12. The image processing device according to claim 1, wherein the processor is configured to:
retrieve the image database using the first object;
correct an image such that the first object in the image obtained by the retrieval becomes similar to the arrangement information of the first object; and
obtain the first co-occurrence information using the corrected image.

13. An image retrieval interface display apparatus comprising:
a processor; and
a display unit coupled to the processor, the display unit being configured to display an image retrieval interface including at least a query input region,
wherein the processor:
obtains arrangement information of each of a plurality of objects;
calculates a total number of each of the plurality of object based on the arrangement information obtained;
calculates first co-occurrence information using a first object, the arrangement information of the first object, and arrangement information of the plurality of objects;
displays at least one of the plurality of objects on the image retrieval interface when the first object is input to the query input region; and
displays at least one candidate for a second object on the query input region based on the input and the output of the at least one of the plurality of objects.

14. The image retrieval interface display apparatus according to claim 13,
wherein the processor:
displays the candidate for the second object on the image retrieval interface after the processor receives a designation of a certain region in the query input region; or
displays the candidate for the second object and a candidate for an arrangement of the second object on the image retrieval interface after the first object is input to the query input region.

15. A method for displaying an image retrieval interface in an information processing device that includes a processor, a storage unit, and a display unit, the storage unit being coupled to the processor, the storage unit storing an image database, the display unit being coupled to the processor, the method comprising:
obtaining arrangement information of each of a plurality of objects on the display unit when the processor accepts an input of a first object via the display unit;
calculating a total number of each of the plurality of objects based on the arrangement information obtained;
calculating first co-occurrence information using the first object the arrangement information of the first object, and the arrangement information of the plurality of objects, by the processor, the first co-occurrence information indicating a correlation relationship with the first object based on the image database;
outputting at least one of the plurality of objects based on the first co-occurrence information to the display unit by the processor;
receiving a user input including a location for a second object; and
suggesting at least one candidate for the second object based on the user input and the output of the at least one of the plurality of objects.

* * * * *